United States Patent
Baser

(10) Patent No.: US 11,833,799 B2
(45) Date of Patent: Dec. 5, 2023

(54) METHOD OF MANUFACTURING A SHEET-LIKE COMPOSITE PART WITH IMPROVED COMPRESSION STRENGTH

(71) Applicant: MITSUBISHI CHEMICAL ADVANCED MATERIALS NV, Tielt (BE)

(72) Inventor: Burak Baser, Aarburg (CH)

(73) Assignee: Mitsubishi Chemical Advanced Materials NV, Tielt (BE)

( * ) Notice: Subject to any disclaimer, the term of this patent is extended or adjusted under 35 U.S.C. 154(b) by 0 days.

(21) Appl. No.: 17/284,665

(22) PCT Filed: Oct. 10, 2019

(86) PCT No.: PCT/EP2019/077546
§ 371 (c)(1),
(2) Date: Apr. 12, 2021

(87) PCT Pub. No.: WO2020/074677
PCT Pub. Date: Apr. 16, 2020

(65) Prior Publication Data
US 2021/0354436 A1 Nov. 18, 2021

(30) Foreign Application Priority Data
Oct. 10, 2018 (EP) .................................... 18199755

(51) Int. Cl.
*E04C 2/32* (2006.01)
*B32B 38/00* (2006.01)
(Continued)

(52) U.S. Cl.
CPC ................ *B32B 38/00* (2013.01); *B32B 3/28* (2013.01); *B32B 5/022* (2013.01); *B32B 5/024* (2013.01);
(Continued)

(58) Field of Classification Search
CPC ......... B32B 38/1883; Y10T 428/24694; Y10T 428/24711; Y10T 428/24719; Y10T 428/24727; E04C 2/322
See application file for complete search history.

(56) References Cited

U.S. PATENT DOCUMENTS 4,552,793 A * 11/1985 Cameron .............. B29C 69/001
428/440
4,950,355 A 8/1990 Klose
(Continued)

FOREIGN PATENT DOCUMENTS

DE 3701592 A1 8/1988
EP 0249261 A1 12/1987
(Continued)

OTHER PUBLICATIONS

Related U.S. Appl. No. 17/284,583, filed Apr. 12, 2021.

*Primary Examiner* — Scott W Dodds
(74) *Attorney, Agent, or Firm* — BROOKS KUSHMAN P.C.

(57) ABSTRACT

Sheet-like composite parts are manufactured by:
a) providing a substantially planar arrangement (A, B, A') comprising a core layer (B) comprising a fleece material made of fleece thermoplastic fibers and reinforcement fibers, sandwiched between a pair of skin layers (A, A'), each comprising a skin thermoplastic and optionally reinforcement fibers, one face of the core layer being adjacent and substantially parallel to a skin layer and a second face of the core layer being adjacent and substantially parallel to the other skin layer,
b) heating and pressing the sandwich arrangement (A,B, A') followed by cooling, thereby obtaining the composite part, wherein the compression strength of the
(Continued)

composite part is improved with a core layer (B) which is a Z-oriented core layer having reinforcement fibers that are predominantly oriented in a direction (Z) perpendicular to the first and second faces, produced by multiple folding.

12 Claims, 4 Drawing Sheets

(51) Int. Cl.
  *B32B 7/09* (2019.01)
  *B32B 3/28* (2006.01)
  *B32B 5/02* (2006.01)
  *B32B 5/12* (2006.01)
  *B32B 37/10* (2006.01)
  *B32B 37/20* (2006.01)

(52) U.S. Cl.
  CPC .................. *B32B 5/12* (2013.01); *B32B 7/09* (2019.01); *B32B 37/10* (2013.01); *B32B 37/20* (2013.01); *E04C 2/322* (2013.01); *B32B 38/1883* (2013.01); *B32B 2038/008* (2013.01); *B32B 2250/03* (2013.01); *B32B 2250/40* (2013.01); *B32B 2262/02* (2013.01); *B32B 2307/718* (2013.01); *Y10T 428/24694* (2015.01); *Y10T 428/24711* (2015.01); *Y10T 428/24727* (2015.01)

(56) References Cited

U.S. PATENT DOCUMENTS

| | | | | |
|---|---|---|---|---|
| 5,322,875 | A | * | 6/1994 | Dages ............... B32B 17/10761 524/304 |
| 5,981,024 | A | * | 11/1999 | Noergaard ............. D04H 13/00 428/113 |
| 7,998,442 | B2 | | 8/2011 | Pohlmann |
| 2001/0006716 | A1 | * | 7/2001 | Brandt .................. D04H 1/736 428/113 |
| 2010/0064491 | A1 | | 3/2010 | Dumas et al. |

FOREIGN PATENT DOCUMENTS

| | | |
|---|---|---|
| EP | 1461484 A1 | 12/2001 |
| EP | 1657375 A1 | 5/2006 |
| SE | 1450978 A1 | 3/2016 |
| WO | 9416162 A1 | 7/1994 |
| WO | 03056087 A1 | 7/2003 |
| WO | 2006105682 A1 | 10/2006 |
| WO | 2006133586 A1 | 12/2006 |
| WO | 2015117799 A1 | 8/2015 |

* cited by examiner

METHOD OF MANUFACTURING A SHEET-LIKE COMPOSITE PART WITH IMPROVED COMPRESSION STRENGTH

CROSS-REFERENCE TO RELATED APPLICATION

This application is the U.S. National Phase of PCT Appln. No. PCT/EP2019/077546 filed Oct. 10, 2019, which claims priority to European Application No. EP 18199755.2 filed Oct. 10, 2018, the disclosures of which are incorporated in their entirety by reference herein.

FIELD OF THE INVENTION

The present invention relates to a novel method of manufacturing a sheet-like composite part with improved compression strength.

BACKGROUND OF THE INVENTION

Composite parts made of fiber reinforced thermoplastics are being widely used in many technical fields.

For example, WO 2015/117799A1 discloses a composite part comprising a foam core that has a first and second skin layer which are bonded to the foam core on a first surface and a second surface thereof, respectively. Similarly, WO 2006/133586 discloses a flexurally rigid composite sheet comprising one or two skin layers with a thickness of 0.5 to 5 mm made of glass-fiber reinforced polypropylene with a glass content of 20 to 60 wt-% and an air voids content of less than 5 vol-%, and a a core layer with a thickness of 2 to 40 mm made of glass-fiber reinforced polypropylene with a glass content of 35 to 80 wt-% and an air voids content of 20 to 80 vol-%. Such porous core sheets can be formed by dry blending of polypropylene fibers and glass fibers, needling of the blended nonwoven, and heat pressing, as extensively described in WO 2006/105682 A1.

A permanent challenge lies in seeking to optimize mechanical properties while keeping the weight as small as possible. In many situations it would be desirable to carry out the manufacturing process with a comparatively thick core layer. Simple up-scaling of core layer thickness leads to the drawback of an initially soft core layer which does not provide sufficient compression strength at the moment when skin layers are being applied in a heat pressing step. It would thus be desirable to provide an improved manufacturing process involving a core layer with improved compression strength.

SUMMARY OF THE INVENTION

According to the invention, there is provided a method of manufacturing a sheet-like composite part, comprising the following process steps:
 a) providing a substantially planar arrangement (A, B, A') comprising a core layer (B) sandwiched between a pair of skin layers (A, A'), a first face of the core layer being adjacent and substantially parallel to a first one (A) of said skin layers and a second face of the core layer being adjacent and substantially parallel to the other one (A') of said skin layers, the skin layers (A, A') each comprising a skin thermoplastic and optionally reinforcement fibers, the core layer (B) comprising a fleece material made of fleece thermoplastic fibers and reinforcement fibers,
 b) heating and pressing the sandwich arrangement (A,B, A') followed by cooling, thereby obtaining the composite part.

DETAILED DESCRIPTION OF THE PREFERRED EMBODIMENTS

The term "skin layer" shall be understood in its broadest terms as referring to a surface layer attached to an inner or core structure. The upper and lower skin layers may or may not have equal thickness. Each one of the skin layers comprises a thermoplastic material called here "skin thermoplastic" for clarity. Moreover, each skin layer optionally comprises reinforcement fibers.

The core layer is formed of a fleece material made of thermoplastic fibers and reinforcement fibers. For clarity, the material making up the thermoplastic fibers will be called here "fleece thermoplastic".

Fiber reinforced thermoplastic fleece materials as the one making up the core layer are widely used in many technical areas, particularly for producing lightweight form parts with advantageous structural properties. They are typically produced with well established carding or air-laying technologies and are basically formed as sheets. As a consequence of the production process, the fibers of such fleece materials are mainly oriented in the sheet plane, i.e. in what may be defined as "X-Y-plane". While it is known that needling a fleece material in a direction perpendicular to the sheet plane slightly increases the amount of reinforcement fibers oriented in Z-direction, the reorienting effect is relatively small and therefore X-Y-orientation remains dominant.

According to the invention, however, the core layer B is a Z-oriented core layer having reinforcement fibers that are predominantly oriented in an orientation direction Z perpendicular to the first and second faces. In this manner, a substantially improved compression strength is achieved.

It should be emphasized that the above mentioned feature "predominant Z-orientation", i.e. perpendicular to a reference X-Y-plane defined by said first and second faces does not rule out a second direction of preferential orientation, i.e. one specific in-plane direction such as Y. Definitely, however, it implies a predominance in Z-direction compared to an isotropic situation.

According to an advantageous embodiment (claim 2), said Z-oriented core layer (B) is provided by multiply folding a sheet of said fleece material into a continuously folded arrangement of mutually parallel and adjacent sheet portions pairwise connected by a first or a second folding edge located, respectively, along a first face or a second face of the continuously folded arrangement, thereby yielding said Z-oriented core layer with exposed first and second faces for applying thereto surface layers (A) and (A') to form said sandwich arrangement (A, B, A') for subsequent process step b).

According to one embodiment, said multiply folding is carried out with appropriate mechanical folding devices, e.g. configured as grippers, holders, stopping surfaces and the like.

According to another embodiment (claim 3), said multiply folding is carried out as a continuous process wherein the sheet of said fleece material is supplied along a processing direction (X) with a first velocity (v1) and subsequently slowed down to a second velocity (v2) which is slower than said first velocity (v1), thereby causing said multiply folding.

In certain embodiments, the core layer is made up by providing a single continuously folded arrangement. In other embodiments (claim 4), the core layer (B) comprises a stacked plurality of continuously folded arrangements of said fleece material. For example, the core layer may comprise two or more identical continuously folded arrangements stacked on top of each other, i.e. forming a double or multiple layer. This includes arrangements where the two stacked continuously folded arrangements are substantially "in phase", i.e. the folding edges of each continuously folded arrangement are at identical longitudinal positions. Alternatively, the two stacked continuously folded arrangements can be "out of phase", thereby shifting and thus minimizing the protruding effect of the folding edges. It is also possible to arrange (claim 5), in addition to the at least one continuously folded arrangement, at least one unfolded layer of fleece material. This allows improvement of surface quality of the composite part, including closing of welding lines formed in the compression step.

According to another embodiment (claim 6), the Z-oriented core layer (B) is provided by filling the fleece material into a compression unit with fixed upper, lower, lateral and terminal walls, applying a longitudinal mechanical compression step by distance reduction between the terminal walls, followed by removal of the upper and lower walls, thereby yielding a laterally confined and longitudinally compressed fleece material forming said Z-oriented core layer with exposed first and second faces for applying thereto surface layers (A) and (A') to form said sandwich arrangement (A, B, A') for subsequent process step b).

According to yet another embodiment (claim 7), the Z-oriented core layer (B) is provided continuously by passing said fleece material through a processing unit comprising, sequentially along a processing direction (X), a compression station, an expansion station and a needling station, the compression station comprising a first roller pair spaced apart by a first distance (d1) and running at a first velocity (v1), the expansion station comprising a second roller pair spaced apart by a second distance (d2) and running at a second velocity (v2), wherein d2>d1 and v2<v1, and the needling station comprising a plurality of needle elements reciprocating perpendicularly to the processing direction (X), thereby yielding a continuous sheet of said Z-oriented core layer with exposed first and second faces for applying thereto surface layers (A) and (A') to form said sandwich arrangement (A, B, A') for subsequent process step b). The second distance d2 is substantially larger than the first distance d1, typically at least by a factor 5, preferably at least by a factor 10. The second velocity v2 is substantially smaller than the first velocity v1; typically by a factor corresponding to the before mentioned distance factor.

As known in the field of fiber reinforced thermoplastics (claim 8), the reinforcement fibers can be selected from a large variety, including but not limited to glass fibers, carbon fibers, aramid fibers, basalt fibers and natural fibers. Alternatively, the reinforcement fibers may be made of a high-melting thermoplastic, i.e. from a material that does not melt at the processing temperatures of the heat pressing step. According to an advantageous embodiment, the reinforcement fibers are glass fibers.

The fleece thermoplastic and the skin thermoplastic can be independently selected from a variety of known polymers such as e.g. polypropylene (PP), polyetherimide (PEI), polysulfone (PSU), polyethersulfone (PES), polyphenylenesulfone (PPSU), polyphthalamide (PPA), polyphenylenether (PPO), polyetheretherketone (PEEK) polyphenylene sulfide (PPS), polyamide (PA), polyaryletherketone (PAEK), polyetherketoneketone (PEKK) and polycarbonate (PC) (claim 9). Advantageously, the fleece thermoplastic and the skin thermoplastic are identical or mutually compatible thermoplastic polymers.

In many advantageous embodiments, the reinforcement fibers are carbon fibers and the fleece thermoplastic and skin thermoplastic are PP, preferably a polypropylene with a melt flow index MFI (230° C., 2.16 kg) of 5 to 500, preferably of 10-to 200 g/10 min.

In certain embodiments (claim 10), at least one skin layer (A, A') comprises a reinforcement sheet consisting of a woven fabric, non-crimp fabric or a unidirectional fiber arrangement.

Depending on application, the core layer (B) provided before processing step b) has an areal weight of 50 to 10'000 g/m$^2$ (claim 11).

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawings, wherein.

It will be understood that the figures are not necessarily drawn to scale. In some instances, relative dimensions are substantially distorted for ease of visualization. Identical or corresponding features in the various figures will generally be denoted with the same reference numerals.

DETAILED DESCRIPTION OF THE INVENTION

Figure 1:
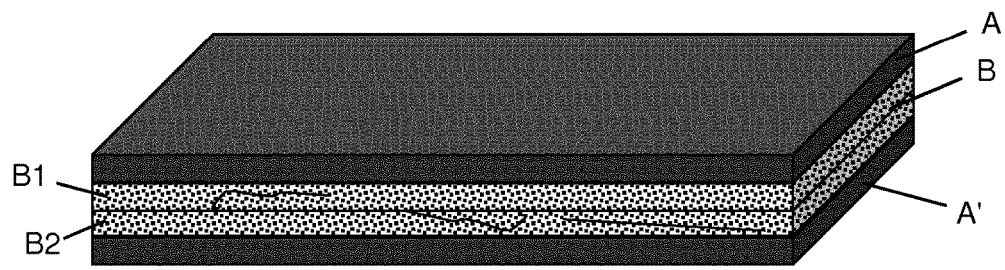
FIG. 1 shows an arrangement to be processed according to prior art, as a perspective view.

It will be understood that the figures are not necessarily drawn to scale. In some instances, relative dimensions are substantially distorted for ease of visualization. Identical or corresponding features in the various figures will generally be denoted with the same reference numerals.

Figure 2:
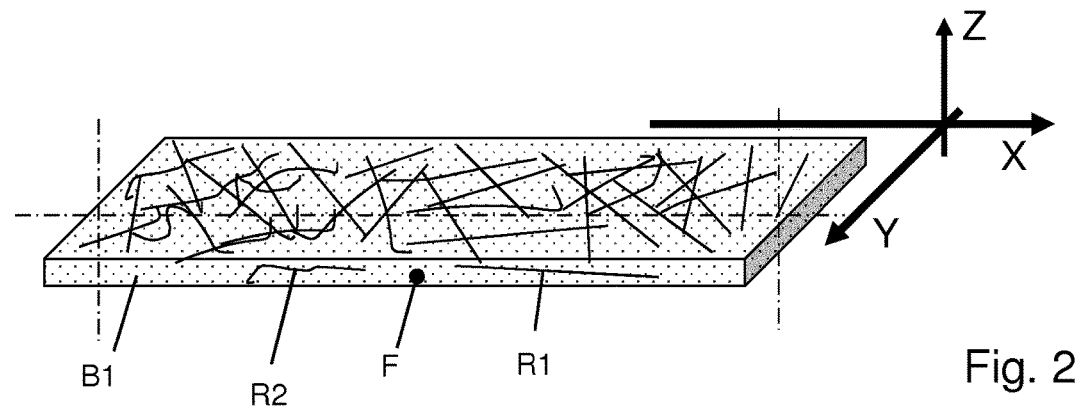
FIG. 2 shows a core layer of the arrangement of FIG. 1, also as a perspective view.
Figure 3:
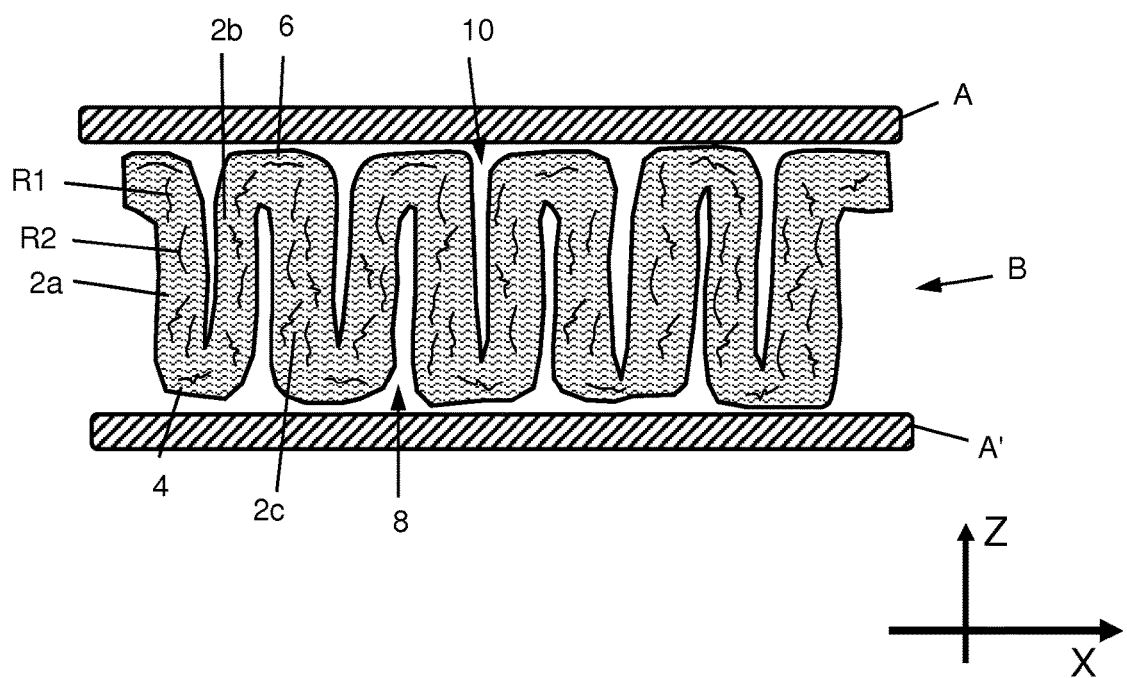
FIG. 3 shows an arrangement processed according to a first embodiment with foldings, as a vertical section perpendicular to the sheet-plane.

A method of manufacturing a sheet-like composite part according to prior art is shown in FIGS. 1 to 3. As generally shown in FIG. 1, the method starts by providing a substantially planar arrangement (A, B, A') comprising a core layer B sandwiched between a pair of skin layers, namely an upper skin layer A and a lower skin layer A'. In the example shown, the core layer B is made up of two individual layers B1 and B2 stacked on top of each other.

A first face of the core layer B is adjacent and substantially parallel to the upper skin layer A whereas the second face of the core layer is adjacent and substantially parallel to the lower skin layer A'.

The two skin layers A, A' each comprise a skin thermoplastic and optionally reinforcement fibers. The core layer B, i.e. each one of the individual layers B1 and B2, comprises a fleece material F made of fleece thermoplastic fibers and further comprising reinforcement fibers R1, R2, etc.

As illustrated in FIG. 2, the orientation of reinforcement fibers R1, R2, etc. in each core layer is predominantly in the layer plane, i.e. in the plane spanned by directional vectors X and Y. More precisely, the reinforcement fibers are oriented in such manner that their longitudinal fiber direction does not have a substantial component in the out-of-plane direction Z. It should be noted that this also applies to curved fibers, in which case one has to consider the local fiber direction at any point along the fiber.

The basic concept of the present invention is now illustrated in FIG. 3. In contrast to the situation shown in FIGS. 1 and 2, there is now a substantial amount of reinforcement fibers R1, R2, etc. having a directional component perpendicular to the faces of the core layer, i.e. along the out-of-plane direction Z.

In the example shown in FIG. 3, this is achieved by having the core layer (B) made up by multiply folding a sheet 2 of fleece material into a continuously folded arrangement of mutually parallel and adjacent sheet portions 2a, 2b, 2c etc. pairwise connected by a first folding edge 4 or a second folding edge 6 located, respectively, along a first face 8 or a second face 10 of the continuously folded arrangement. More specifically, in the example of FIG. 3 sheet portions 2a and 2b are connected by first folding edge 4, whereas sheet portions 2b and 2c are connected by second folding edge 6. This yields a Z-oriented core layer with exposed first and second faces 8, 10 onto which the surface layers A and A' are then applied to form a sandwich arrangement A, B, A'.

The sandwich arrangement A, B, A' thus obtained can then be subjected to a heating and pressing step followed by cooling, thereby obtaining a sheet-like composite part with excellent compression strength properties.

Figure 4:
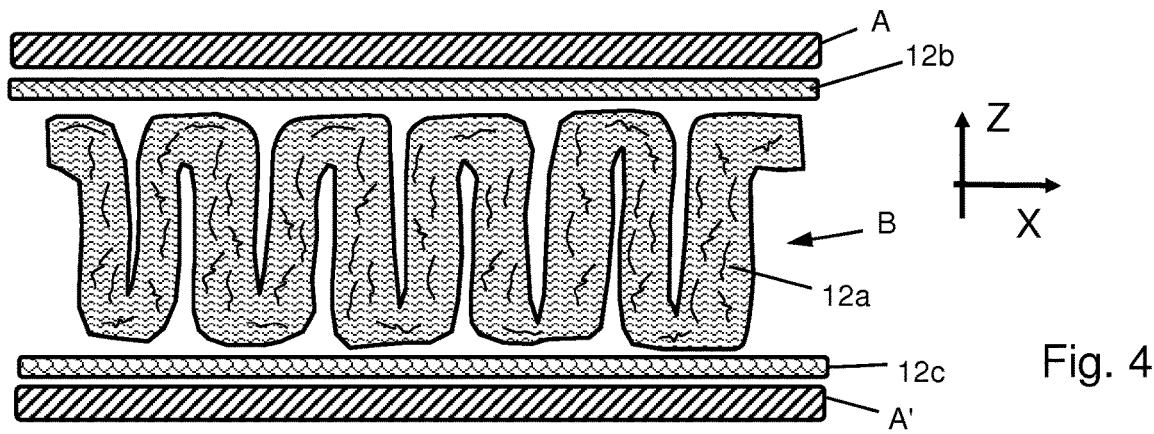
FIG. 4 shows an arrangement processed according to a second embodiment with foldings, as a vertical section perpendicular to the sheet-plane.
Figure 5:
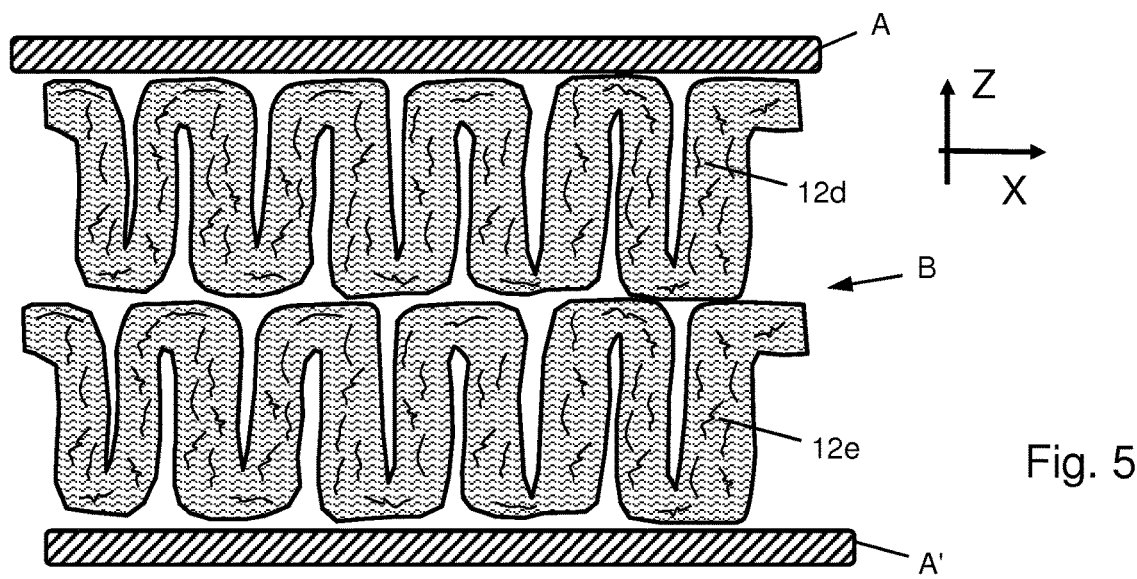
FIG. 5 shows an arrangement processed according to a third embodiment with foldings, as a vertical section perpendicular to the sheet-plane.
Figure 6:
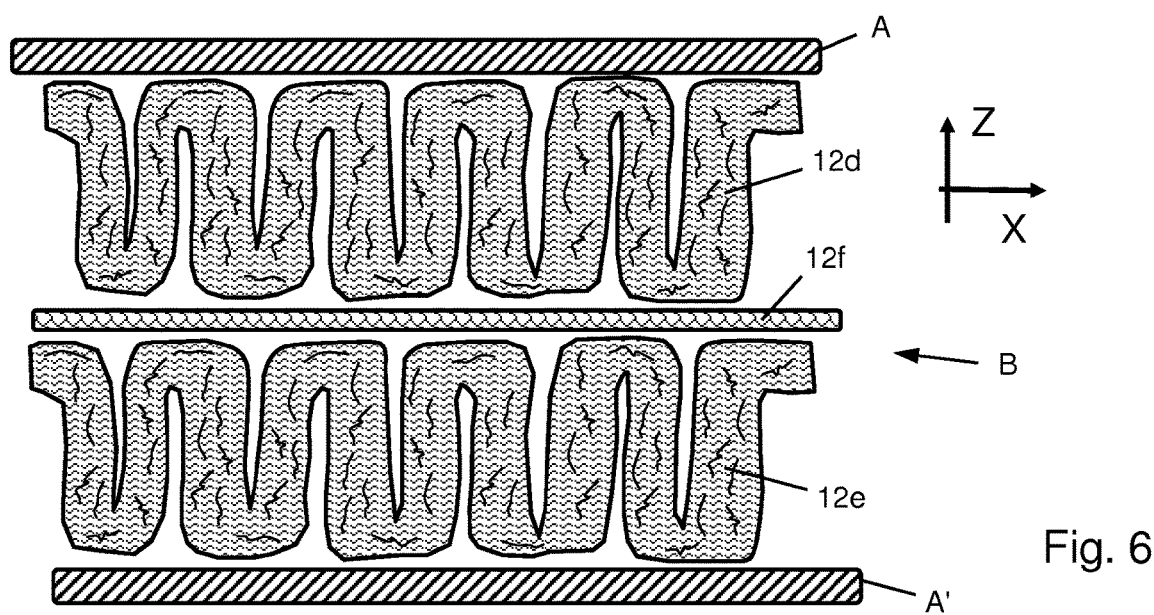
FIG. 6 shows an arrangement processed according to a fourth embodiment with foldings, as a vertical section perpendicular to the sheet-plane.
Figure 7:
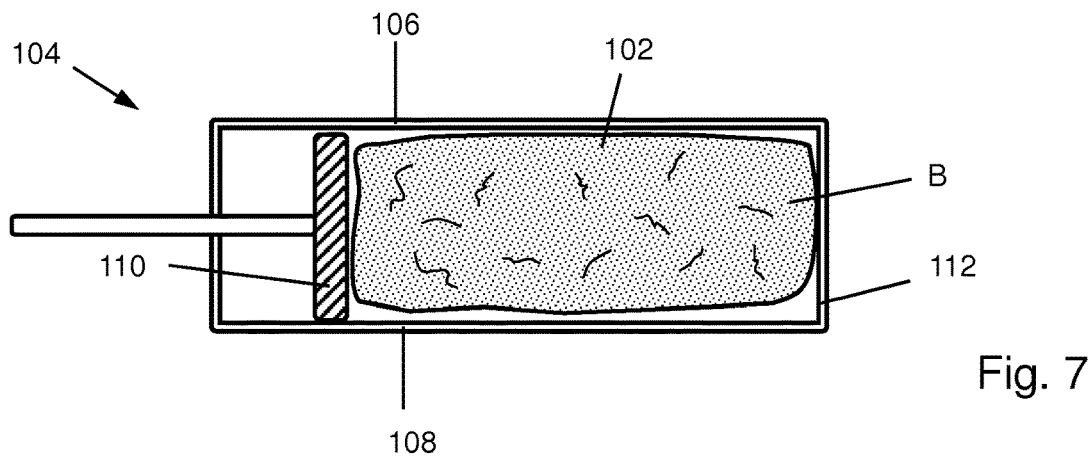
FIGS. 7 to 10 show various processing steps according to a fifth embodiment with longitudinal compression, as a vertical section perpendicular to the sheet-plane.

Further embodiments based on the same principle using a folded fleece sheet material are shown in FIGS. 4 to 6.

In the example of FIG. 4, the core layer B comprises one continuously folded arrangement 12a and a pair of unfolded layers 12b and 12c of the same fleece material. In this particular example, the folded layer 12a is positioned between unfolded layers 12b and 12c.

In the example of FIG. 5, the core layer B comprises two continuously folded arrangements 12d and 12e stacked on top of each other and forming a double layer located between the upper skin layer A and the lower skin layer A'. In the arrangement shown here, the two stacked continuously folded layers 12d and 12e are substantially "out of phase", thereby shifting and thus minimizing the protruding effect of the folding edges.

In the example of FIG. 6, the core layer B comprises a triple stack comprising two continuously folded arrangements 12d and 12e and an unfolded layers 12f located therebetween.

In certain embodiments, the multiply folded layer is carried out as a continuous process wherein the sheet of said fleece material is supplied along a processing direction (X) with a first velocity (v1) and subsequently slowed down to a second velocity (v2) which is slower than said first velocity (v1), thereby causing said multiply folding.

Figure 8:
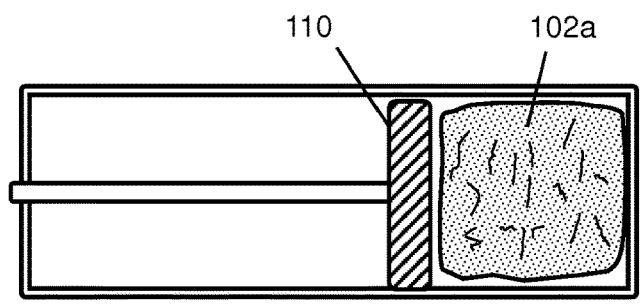
Figure 9:
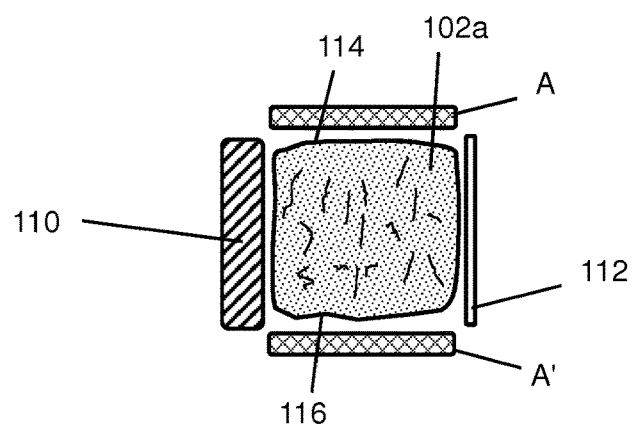
Figure 10:
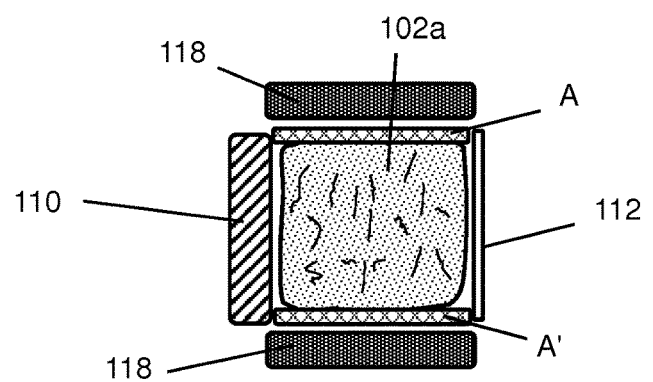

A different approach for providing a Z-oriented core layer is used in a fifth embodiment, which is illustrated in FIGS. 7 to 10. Here, the required Z-oriented core layer B is formed by filling the fleece material 102, which comprises fleece thermoplastic fibers and reinforcement fibers, into a compression unit 104 with a fixed upper wall 106, lower wall 108, lateral walls (not shown) and terminal walls 110 and 112. Initially, in the situation shown in FIG. 7, the orientation of the reinforcement fibers is substantially isotropic. By applying a longitudinal mechanical compression step, achieved in this case by reducing the distance between the terminal walls, yields a laterally confined and longitudinally compressed fleece material 102a as shown in FIG. 8. In this situation, the reinforcement fibers are preferentially oriented perpendicular to the direction X of compression. Removal of the upper and lower walls provides a Z-oriented core layer with exposed first (upper) face 114 and second (lower) face 116. This is followed by applying thereon an upper surface layer A and a lower surface A' to form a sandwich arrangement A, B, A' as shown in FIG. 9. Finally, as shown in FIG. 10, the sandwich arrangement A, B, A' is subjected to a heating and pressing with an appropriate tool 118 step followed by cooling, thereby obtaining a sheet-like composite part with excellent compression strength properties.

Figure 11:
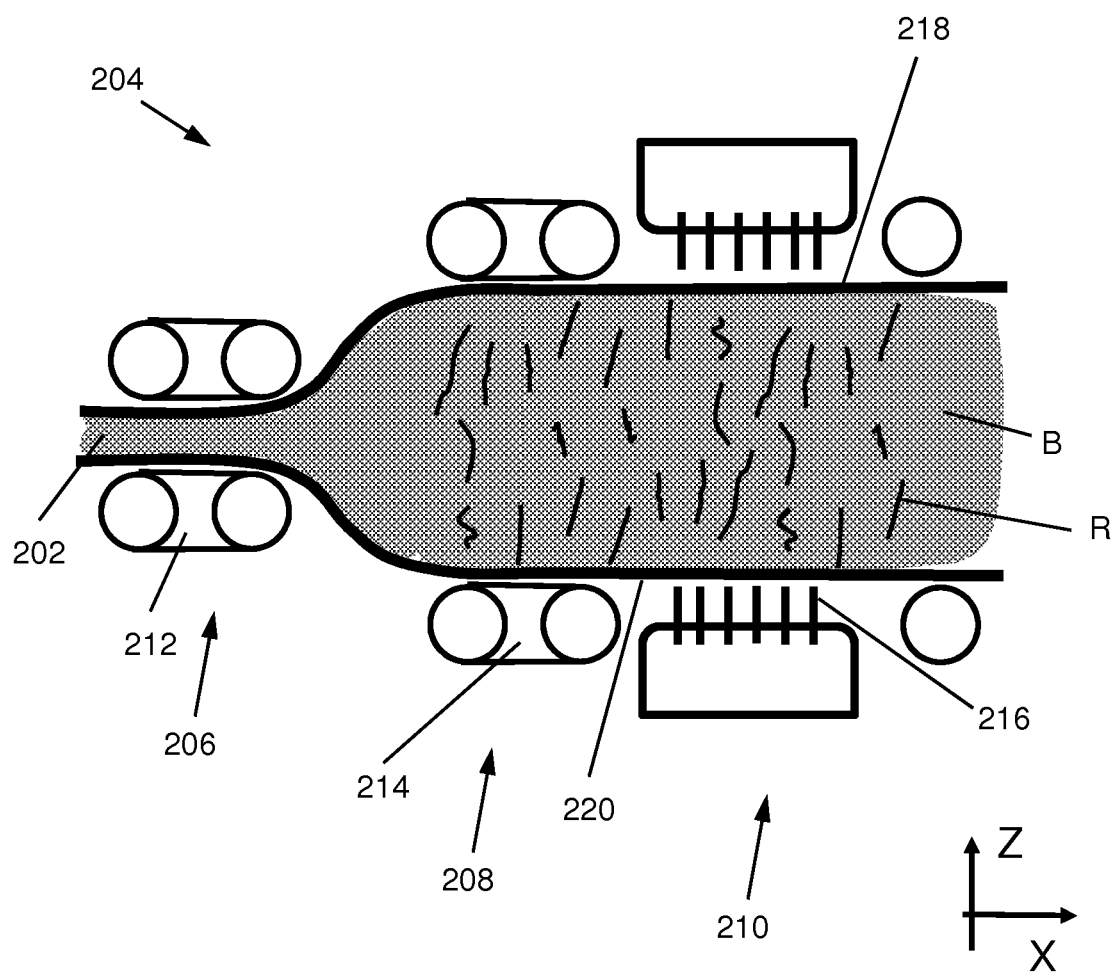
FIG. 11 shows an arrangement for a process according to a sixth embodiment with needling, as a vertical section perpendicular to the sheet-plane.

A further approach for providing a Z-oriented core layer is used in a sixth embodiment, which is illustrated in FIG. 11. In this case, the required Z-oriented core layer B is produced continuously by passing the fleece material 202, which comprises fleece thermoplastic fibers and reinforcement fibers R, through a processing unit 204. The latter comprises, sequentially along a processing direction X, a compression station 206, an expansion station 208, and a needling station 210. More specifically, the compression station 206 comprises a first roller pair 212 spaced apart by a first distance d1 and running at a first velocity v1. The subsequent expansion station 208 comprises a second roller pair 214 spaced apart by a second distance d2 which is substantially larger than the first distance 1. The second roller pair runs at a second velocity v2 which is substantially smaller than the first velocity v1. As illustrated in FIG. 11, the fleece material follows the diverging cross-sectional profile of the processing unit, effectively leading to an expansion. The latter phenomenon leads to a reorientation of the reinforcement fibers R contained in the fleece material so as to be preferentially oriented perpendicular to the processing direction X. In order to maintain the resulting Z-orientation, the material passes the needling station 210 comprising a plurality of needle elements 216 reciprocating perpendicularly to the processing direction X. The Z-oriented core layer thus obtained has an exposed first (upper) face 218 and second (lower) face 220.

Because the core layer is produced as a substantially endless material, the following application of an upper surface layer A and a lower surface A' to form a sandwich arrangement A, B, A' for subsequent heating and pressing followed by cooling can be carried out in a continuous process. Alternatively, the Z-oriented core material can be cut in sections and processed by applying corresponding sections of surface layer material.

The invention claimed is:

1. A method of manufacturing a sheet-like composite part, comprising the following process steps:
   a) providing a substantially planar sandwich arrangement (A, B, A') comprising a core layer (B) sandwiched between a pair of skin layers (A, A'), a first face of the core layer being adjacent and substantially parallel to a first one (A) of said skin layers and a second face of the core layer being adjacent and substantially parallel to the other one (A") of said skin layers, the skin layers (A, A') each comprising a skin thermoplastic and optionally reinforcement fibers, the core layer (B) comprising a fleece material made of fleece thermoplastic fibers and reinforcement fibers, wherein said fleece material is prepared with the fleece thermoplastic fibers and the reinforcement fibers in an airlaying or carding process, b) heating to melt the skin layers and pressing the sandwich arrangement (A,B,A') followed by cooling, thereby obtaining the sheet-like composite part, wherein the core layer (B) is a Z-oriented core layer having the reinforcement fibers predominantly oriented in an orientation direction (Z) perpendicular to the first and second faces, and wherein the core layer (B) comprises a stacked plurality of continuously folded arrangements of said fleece material.

2. The method according to claim 1, wherein one of the continuously folded arrangements of said Z-oriented core layer (B) is provided by multiply folding a sheet of said fleece material into a continuously folded arrangement of mutually parallel and adjacent sheet portions pairwise connected by a first or a second folding edge located, respectively, along a first face or a second face of the continuously folded arrangement, thereby yielding said Z-oriented core layer with exposed first and second faces for applying thereto the skin layers (A) and (A') to form said sandwich arrangement (A, B, A') for subsequent process step b).

3. The method according to claim 2, wherein said multiply folding is carried out as a continuous process wherein the sheet of said fleece material is supplied along a processing direction (X) with a first velocity (v1) and subsequently slowed down to a second velocity (v2) which is slower than said first velocity (v1), thereby causing said multiply folding.

4. The method according to claim 2, wherein said core layer (B) further comprises at least one unfolded layer of said fleece material.

5. The method according to claim 1, wherein said reinforcement fibers are selected from the group consisting of glass fibers, carbon fibers, aramid fibers, basalt fibers, natural fibers, high-melting thermoplastic fibers, and mixtures thereof.

6. The method of claim 1, wherein said fleece thermoplastic and said skin thermoplastic are independently selected from the group consisting of polypropylene, polyethermide, polyethersulfone, polysulfone, polyphenylenesulfone, polyphthalamide, polyphenylether, polyetheretherketone, polyphenylene sulfide, polyamide, polyaryletherketone, polyetherketoneketone, polycarbonate and mixtures thereof.

7. The method of claim 1, wherein at least one skin layer (A, A') comprises a reinforcement sheet consisting of a woven fabric, non-crimp fabric or a unidirectional fiber arrangement.

8. The method of claim 1, wherein the core layer (B) provided before processing step b) has an areal weight of 50 to 10,000 g/m$^2$.

9. The method of claim 1, wherein the fleece material is prepared by the airlaying process.

10. The method of claim 1, wherein the fleece material is prepared by the carding process.

11. The method of claim 1, wherein the thermoplastic of the skin layers is the same as the fleece thermoplastic.

12. The method of claim 1, wherein the thermoplastic of the skin layer and the fleece thermoplastic are mutually compatible.

* * * * *